United States Patent [19]

Sabet

[11] Patent Number: 4,712,765

[45] Date of Patent: Dec. 15, 1987

[54] APPARATUS FOR PRODUCING COATED PANELS

[75] Inventor: Iraj Sabet, Bassecourt, Switzerland

[73] Assignee: Stella Werke AG, Bassecourt, Switzerland

[21] Appl. No.: 804,187

[22] Filed: Dec. 3, 1985

[30] Foreign Application Priority Data

Dec. 4, 1984 [CH] Switzerland ............... 5761/84

[51] Int. Cl.$^4$ ............... B29C 33/10; B29C 33/14; B29C 39/10; B29C 45/14
[52] U.S. Cl. ............... 249/91; 249/83; 264/275; 264/279; 264/328.12; 425/117; 425/127; 425/129 R; 425/568; 425/571; 425/812
[58] Field of Search ............... 264/275, 279, 328.12, 264/101, 108, 272.17; 425/117, 127, 568, 569, 571, 129 R, 812; 249/83, 91

[56] References Cited

U.S. PATENT DOCUMENTS 2,994,925  8/1961  Gits ............... 264/275 X

FOREIGN PATENT DOCUMENTS 2232094  1/1973  Fed. Rep. of Germany ............... 264/328.12
59-218827 12/1984  Japan ............... 264/328.12
557232 12/1974  Switzerland .

Primary Examiner—Jeffery Thurlow
Assistant Examiner—Leo B. Tentoni
Attorney, Agent, or Firm—Holman & Stern

[57] ABSTRACT

Panels having an integral coat of a cross-linked polymer matrix are formed in the cavity of a closed mold consisting of a lid and a tray; the preformed core of the panel is supported but by the lid and an essentially continuous free space corresponding with the coat to be formed around the core is maintained between the latter and the mold cavity; an essentially prismatic space or chamber is provided at a rim juncture of tray and lid adjacent to, yet outside of, the mold cavity of the closed mold; an elongated slit-shaped opening extending over at least half the length of one side of the mold cavity is formed at an end of the prismatic space; the inlet opening ends in the prismatic space and an essentially laminar flow is achieved throughout the mold cavity when a liquid resin composition that has a viscosity of less than 10 Pascal.seconds and is capable of forming a cross-linked polymer matrix upon curing is fed through the inlet positioned near the lower end of the closed mold held in an inclined position for gradual filling with an ascending stream of the liquid resin composition; integrally and heavily coated panels free of surface defects in their visible portions can be obtained after setting and curing of the resin.

3 Claims, 10 Drawing Figures

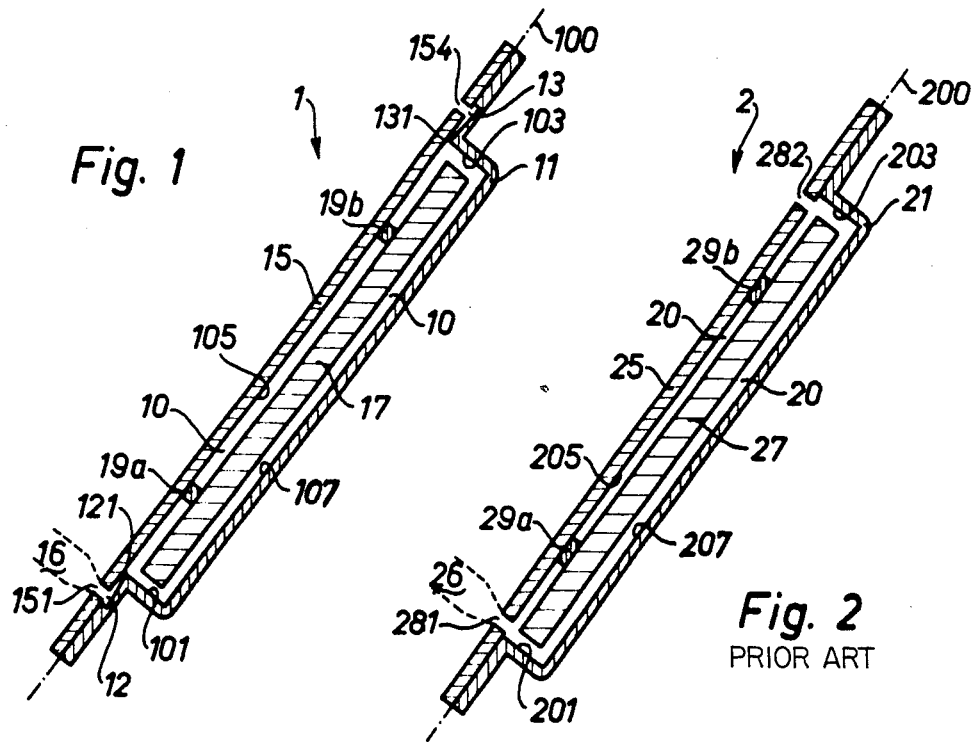
Fig. 1
Fig. 2
PRIOR ART
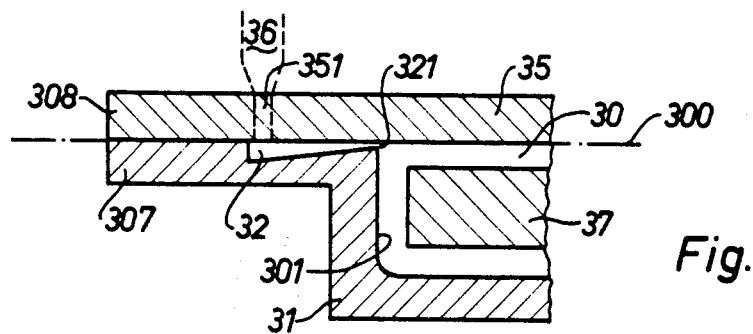
Fig. 3
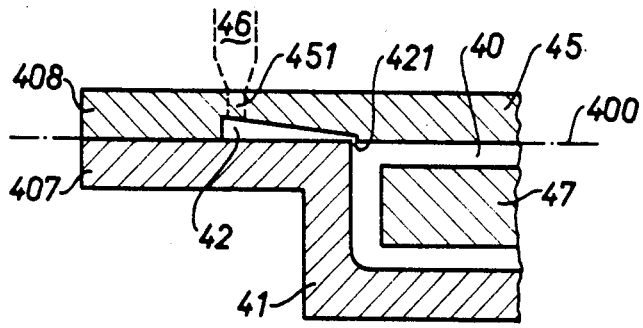
Fig. 4

APPARATUS FOR PRODUCING COATED PANELS

BACKGROUND OF THE INVENTION (a) Field of the Invention

This invention generally relates t the art of polymer molding and specifically to a method of producing a panel having an essentially integral or "monolithic" coating of a cross-linked polymer matrix formed in a closed mold containing a panel core.

(b) Prior Art of the Invention

Coating methods can be divided roughly into two groups depending upon whether a preformed coating layer is applied to a substrate, e.g. as in laminating techniques where a thermoset layer, frequently on a thin support layer, is adhesively connected with a structural support such as a chipboard or the like material in a platen press, or whether the coating is formed upon the structural support, e.g. by applying a liquid (including viscous) composition onto the support and by drying, setting or curing the liquid composition.

The advantage of forming the coating on the substrate is that "monolithic" coatings, i.e. completely encompassing or "enrobing" the support, can be obtained but production of "heavy" coats, e.g. in the thickness range of typically between about 1 mm and about 5 mm or more, is not normally possible by typical coating methods, such as by dipping or spraying.

The advantage of applying preformed coats is that heavy coats can be applied at least as easily as thin coats but the coating cannot normally be made monolithic, nor adapted to shaped surface structures (i.e. substantially deviating from planarity).

Further, the nature of the polymer or polymers that form the continuous phase of the coat will have a substantial impact upon the available spectrum of techniques; while thermoplastic materials provide for most variation as regards application technique, a requirement of maximum resistance against humidity, chemical or abrasive attack, etc. requires coats or coatings of cross-linked or "duromeric" polymers, such as epoxy or cross-linked polyesters, polyurethanes, etc., generally with a high portion of inorganic filler dispersed in the cross-linked polymer phase or matrix.

For example, table tops, front panels and many other more or less typical furniture components for heavy duty use in laboratories, hospitals, kitchens, swimming pools, bathrooms, etc. having maximum resistance against humidity, abrasion, intensive cleaning, disinfectants, organic solvents, heat, etc. combined with pleasing external appearance and touch require heavy integral coatings of the cross-linked or duromeric type which can be obtained but by casting methods, such as disclosed in U.S. Pat. No. 3,832,264 (Barnette) or in Assignee's Swiss Patent No. 557,232.

While the Barnette method produces what is called a cast plastic laminate in the patent and does not contemplate integral coating, the cast molding method illustrated in FIGS. 6 to 9 of Swiss Patent No. 557,232 does yield panels with heavy monolithic coats optimally suited for heavy duty uses of the type mentioned above.

To this end, the Swiss Patent teaches using a cast mold formed by a lower tray portion and a co-acting and generally flat upper lid portion; the panel core, e.g. a rectangular piece of chip-board, is attached with a few, say 2 to 6, mounting pins on the lid but at a distance therefrom; then, the mold is closed by engaging the rim of the tray portion with a generally co-extensive inner surface area of the lid portion, usually including sealing means, e.g. a rubber insert, provided at the interface.

The shape (including dimensions) of the mold cavity is selected so as to define, in essence, the external shape (and dimensions) of the final integrally coated panel while the shape (including dimensions) of the core and its arrangement on the lid are selected such that a free interspace which corresponds, in essence, with the coat that is to be cast and extends substantially around the entire core (excluding but a few small spots formed by the mounting pins) remains.

Mounting brackets, pneumatic clamps or the like means are used to hold the lid in sealing engagement with the tray and the closed mold is arranged in an inclined position, i.e. so as to include an angle of less than 90° and more than 0°, and so that the inlet opening is at the lowest part of the closed mold while the outlet opening is at the most elevated point.

Injection is continued until the mold is filled; the outlet opening in the lid at the upper end of the closed mold when in casting position is provided to permit displacement of air and to show complete mold filling by emergence of liquid resin composition.

The closed mold is held at ambient conditions until the resin composition has set (solidified by gel formation) to an extent sufficient for removal of core plus coat from the mold (using conventional mold release means or agents). Final curing is effected at an elevated temperature depending upon the cross-linking requirements of the particular composition.

I have found, however, that even if core mounting, mold closure, resin injection, positioning of the mold and withdrawal of the coated product are automated and optimized, notably as regards positioning of the mold during injection, this conventional method leads to a relatively high rate of products having visible surface irregularities including undesired "textures", macroscopic inhomogeneities or physical defects, e.g. voids or pores.

OBJECTS OF THE INVENTION

Accordingly, a main object of the invention is to provide for an improved method of producing a panel having an essentially integral coat of a cross-linked polymer matrix so as to obtain product panels that are essentially free of visible surface defects.

A further object of the invention is a method for producing an improved coat of a cross-linked polymer matrix in contact with a panel core by a mold-casting method in which positioning of the mold during injection is less critical.

Another object of the invention is an improved mold for producing heavily coated panels by cast-molding techniques.

Other objects will become apparent as this specification proceeds.

SUMMARY OF THE INVENTION

Now, according to the invention, I have found that most of the above mentioned surface defects of coatings of panels produced by mold-casting according to prior art techniques may be explained by the consequences of local turbulence of the flow or stream of liquid resin when filling the mold cavity that is not occupied by the core.

Keeping in mind that polymer coated panels tend to be used in visually prominent positions, e.g. table tops, drawer fronts and cabinet doors, and that the human eye is most sensitive to surface irregularities, I have found that noticeable surface imperfections may result from such minimal effects as inhomogeneity of resin/filler distribution which, in turn, may be turbulence-induced because the specific mass of typical filler particles of cross-linking polymer compositions may be three to five times higher than that of the liquid resin (or pre-polymer). Without wishing to be bound by any particular theory, I have found that a perfect surface quality of the cross-linked coat made by mold-casting of appropriate resin mixtures around a suitable core is obtained if a substantially laminar flow is maintained throughout the mold cavity.

This is achieved, according to the invention, in a mold-casting technique comprising the following steps:

(a) Providing a mold comprised essentially of a tray portion and a lid portion capable of forming a mold cavity having a shape corresponding with said panel and being substantially defined by a top face, a bottom face and at least four side faces, said mold having an inlet opening near one mold end, an outlet opening near an opposed mold end, and a rim juncture formed by co-acting and normally planar parallel surface portions of the lid and the tray when the mold is closed;

(b) attaching the panel core, e.g. a rectangular piece of chip-board, on the inner side of the lid with a free interspace between lid and core and closing the mold by connecting the lid with attached core and the tray so that the core is held within the mold cavity to form a generally free interspace extending substantially around the core and defining that space which—after filling with liquid resin and setting of the latter—conforms with the coat of the panel; for reasons explained in more detail below the distance of the interspace between any core portion and any nearest portion of the mold cavity wall should have a specified minimum value that, in addition to determining the thickness of the coat, is important for precluding local turbulence;

(c) arranging the closed mold in an inclined position and feeding a liquid resin composition capable of forming a cross-linked solid polymer matrix upon curing into the inlet opening until the interspace between core and mold cavity is filled and until the liquid resin composition begins to emerge at the outlet opening;

(d) allowing the liquid resin composition to set for subsequent removal of the coated core and cross-linking of the polymer.

According to a first general embodiment of the invention, the above defined method comprises the improvement of (e) providing an essentially prismatic space at the rim juncture of the lid and the tray intermediate the inlet opening and the mold cavity; the prismatic space extends over at least about 50% of the length of one of the side faces of the mold cavity and communicates therewith through a slit-shaped nozzle means formed by an edge portion of the prismatic space; and (f) feeding the liquid resin composition through the lid's inlet into the prismatic space so as to form a smooth continuous film of the liquid resin composition at the slit-shaped nozzle means and to fill the interspace with the liquid resin composition in an essentially laminar flow throughout.

Thus, while the liquid resin is still injected into the mold, it is not injected directly into the mold cavity but into the prismatic space where the liquid resin is first spread to form a smooth film which then proceeds, in laminar flow, through what is generally termed a slit-shaped nozzle means herein and enters the mold cavity without turbulence upon entry.

As used herein, the term "prismatic space" is intended to refer to a space or chamber that is a part of the mold but not of the actual mold cavity and has the general geometric shape of a prism, i.e. an elongated column having relatively small parallel bases, or end faces, of a generally polygonal, preferably triangular or tetrangular shape, and relatively large elongated side faces.

The slit-shaped nozzle means is formed in the walls that confine the long side faces of the prismatic space by omitting an edge portion, preferably an acute edge, so as to form an elongated opening between two elongated side faces of the prismatic space for transforming a turbulent, high velocity injection stream produced by an external injection means into a relatively slow film-like stream in a laminar state of flow.

The invention further comprises a casting mold for use in the above defined method consisting essentially of:

(A) a lower or tray portion (molding tray) having an inner bottom face, at least four inner side faces and an essentially continuous rim face adjoining the inner side faces;

(B) an upper or lid portion (mold lid) having a face that is co-extensive with the tray portion to the extent that it is capable to form a mold cavity upon joining of lid and tray portion in an essentially coplanar junction (also termed "juncture" herein); the lid is provided with means for supporting a panel core distanced from the adjacent lid surface;

(C) an inlet opening for introducing a liquid resin composition into said mold, and an outlet opening for permitting escape of air from the mold upon introduction of the liquid resin composition.

According to a second general embodiment of the invention the said mold comprises the improvement of:

(D) an elongated recess aligned with one of the tray's inner side faces and adjoining thereto; the recess is provided between the tray's rim face and the rim-contacting lid portion at the junction; the recess is shaped to form an elongated and essentially prismatic space within the mold but outside of the mold cavity when the tray's rim face is in contact with the junction-forming lid portion; the prismatic space has an edge portion extending over at least about 50% of the adjacent inner side face of the tray and forms a slit-shaped nozzle means that opens into the mold cavity of the closed casting mold; the inlet opening, preferably a circular opening extending through the lid, ends in the prismatic space; as a result, the liquid resin can be fed as a laminar flat stream into the mold cavity.

BRIEF DESCRIPTION OF PREFERRED EMBODIMENTS

According to a preferred embodiment of the inventive method, maximum flow velocity of the liquid resin when passing the slit-shaped nozzle means formed adjacent to the inlet opening is controlled, e.g. to be within the range of from about 0.5 to 50 meters per minute, preferably not more than 30 meters per minute. This can be calculated from the dimensions of the nozzle and the specific flow parameters of the liquid resin composition, or determined by means of a few simple experiments.

The viscosity of the liquid resin composition (this term includes all constituents, e.g. fillers, additives, adjuvants, catalyst, etc. in addition to the resin or prepolymer component) preferably is in the range of from 0.1 to 10 Pascal. seconds when measured at 25° C.; also, low injection pressures, e.g. in the range of from 0.5 to 10 bar (measured at the cylinder of the injection gun or the like device used to feed the resin composition into the inlet opening) are preferred.

When the maximum flow velocity at the slit-shaped nozzle means used in the inventive method is controlled and when, at the same time, any cross-section of flow within the free interspace between panel core and mold cavity walls is maintained to exceed the cross-section of flow through the slitshaped nozzle means, flow conditions in any part of the mold cavity will be at least as smooth (and non-turbulent) as those at the nozzle.

It is preferred for many purposes of the invention when the thickness of the cast coat of the final panel produced according to the invention is in the range of between about 1 mm and about 5 mm or more, the upper limit not being essential except for commercial considerations while coating thicknesses of substantially below about 1 mm do not normally provide for sufficient strength of the coat.

A further preferred embodiment ofthe inventive method comprises forming the prismatic space by a back face (of a recess in rim of tray, or rim portion of lid) remote from the slitshaped nozzle means, and two essentially planar side faces (one formed by the recess and the other by the "second" mold portion that contacts the "first" or recess-bearing mold portion), each side face commencing at the slit-shaped nozzle and extending to said back face; preferably, these side faces together enclose an acute angle between about zero and about 45° (assuming 360° for a full circle).

BRIEF DESCRIPTION OF THE DRAWINGS

The invention will be explained in more detail with reference to the annexed drawings in which:

FIG. 1 is a diagrammatic sectional view of a casting mold suitable for practicing the invention at the stage just before actual casting;

FIG. 2 is a diagrammatic sectional view of a prior art mold used in a prior art method and shown just before actual casting;

FIG. 3 is an enlarged sectional view of the lower rim juncture of the mold shown in FIG. 1;

FIG. 4 is an enlarged sectional view of a modification of the rim juncture shown in FIG. 3;

DETAILED DESCRIPTION OF PREFERRED EMBODIMENTS OF THE INVENTION

Figure 5A:
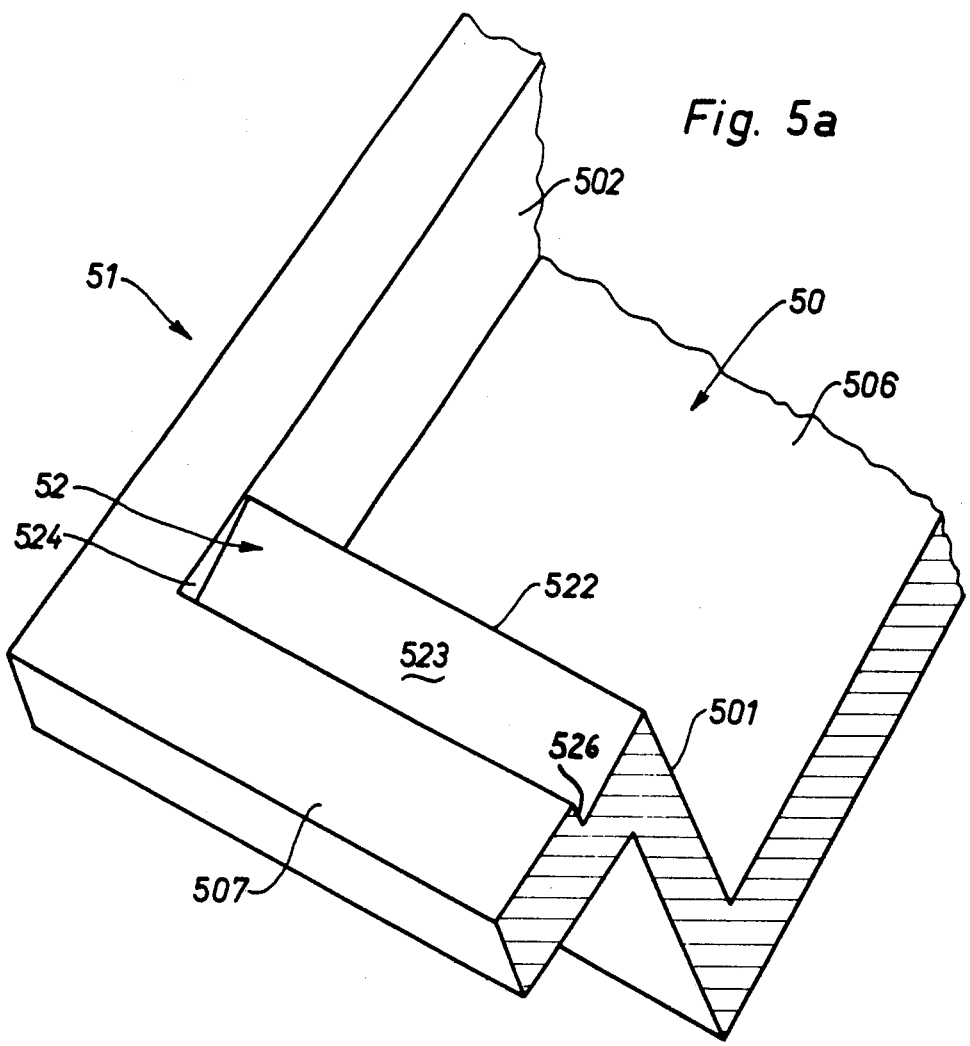
FIG. 5a is a perspective view of an even more enlarged presentation of the tray portion of a mold for practicing the invention as illustrated in FIG. 1.

FIG. 1 and 2 each illustrate a casting mold for producing panels that have an essentially integral or monolithic coat of a cross-linked polymer matrix; the mold is shown in an inclined position just before casting.

For purposes of comparison and explanation, FIG. 1 shows a mold 1 for the inventive method while FIG. 2 shows a comparable prior art mold 2 at the same stage of producing coated panels. For simplicity, numerals are used herein to indicate, by the first digit, the number of the Figure in which they are shown while the second and possibly the third digit are selected to show the same or comparable components.

Thus, the planes of closure of molds 1, 2 have the reference numbers 100, 200. In a similarly corresponding manner, each tray portion 11, 21 is sealingly closed with a lid portion 15, 25 which, in turn, is provided with means 19a, 19b, 29a, 29b to support panel core 17, 27 at a distance from the inner surface 105, 205 of lid 15, 25. In either case, a major portion of the mold cavity formed between each tray 11, 21 and each planar lid 15, 25 upon closure of the mold is occupied by core 17, 27 and only the remaining free interspace 10, 20 will be filled upon casting. Interspace 10, 20 extends substantially around the entire surface of core 17, 27 because the support means 19a, 19b, 29a, 29b form but relatively small interruptions or spots that could be filled in a separate step but do not normally impair use of panels that will require mounting at their "rear" walls, i.e. where the coat formed by interspace 10, 20 will have minor interruptions or holes.

Also, in both molds 1, 2 the mold cavity is defined by the four inner faces (only two shown, i.e. 101, 103; 201, 203) and the bottom face 107, 207 of each molding tray 11, 21 and the exposed inner face 105, 205 of the planar lid 15, 25.

The junction of each tray 11, 21 and each lid 15, 25 is effected by a rim juncture, i.e. face or rim portions of lid 15, 25 and tray 11, 21 in the mold closure planes 100, 200.

It should be noted that both the structure and the casting position of prior art mold 2 are shown in a somewhat simplified manner. In actual mold casting practice, the casting position of mold 2 would be more complicated because prior art molds and methods require that the inlet opening 281 would end in one corner portion of interspace 20 while outlet portion 282 would be in a diagonally opposed corner portion; further, mold 2 would have to be positioned diagonally corner-above-corner so as to place inlet opening 281 at the lowest possible level while outlet opening 282 is at the highest possible level. The presentation of mold 2 in FIG. 2 is simplified but for comparative purposes. Further, while a relatively steep inclination (45° to 90° relative to the horizontal plane) would be required with prior art mold 2 for actual casting, the inventive method and mold 1 will operate safely at a less inclined (10° to 40°), in addition to not requiring corner-above-corner, position.

For casting a coat around cores 17, 27, the interspaces 10, 20 are filled with a castable resin composition capable of forming a cross-linked polymer matrix; to this end, an appropriate liquid (including viscous) resin composition as disclosed, for example, in the above mentioned patents is fed into molds 1, 2, e.g. by means of a conventional injection gun (represented in broken lines) 16, 26 through the respective inlet openings until the mold is filled as shown by the emergence of liquid resin composition at the respective outlet openings. The injection pressure (measured within the gun) preferably is below 10 bar.

Conventional cold-setting compositions, e.g. capable of setting and, preferably, at least partially cross-linking, at ambient temperatures and pressures are preferred for many purposes of the invention and typical examples are disclosed in the above mentioned Swiss Patent No. 557,232; generally, such compositions comprise a prepolymer suitable to undergo cross-linking, e.g. unsaturated polyesters in mixture with appropriate monomers and mineral filler or mixture of fillers, e.g. ground stone or glass, pigment, catalyst, accelerator (co-catalyst), stabilizer, etc. Further, conventional separating means or agents, e.g. a non-permanent coating of a paraffinic wax or a permanent coating of a fluorinated polymer (e.g. a teflon) will generally be used on the resin-exposed surfaces of the mold.

While the inlet opening 281 of the prior art mold 2 ends within the actual mold cavity 20, the invention provides for an essentially prismatic space 12 at the rim juncture of tray 11 with lid 15 as explained in more detail below; inlet opening 151 ends in space 12 that communicates with mold cavity 10 but through a slit-shaped nozzle-type opening 121 that extends over at least 50%, typically over 60 to 100% of the length of the adjoining mold face 101. As a consequence, the liquid resin composition expelled by injection gun 16 in the form of a fast-flowing circular jet will be spread and converted into a smooth film prior to entering mold cavity 10.

Preferably, the outlet end 154 of mold 1 is structured symmetrically, i.e. including a slit-shaped opening 131 extending over at least 50% of the length of adjoining side face 103 of mold cavity 10 as the only communication between mold cavity 10 and outlet opening 154.

It should be mentioned here that, typically, a panel produced by mold-casting of a heavy integral coat around a panel core when used as a typical furniture component, such as a table top, will have three generally visible surfaces (top face and side faces) while the "rear" face, i.e. that formed between the core and the core-supporting lid, is less critical so that the only interruptions of the integral coat produced in mold 1 due to supports 19a, b are not very critical; the coat formed at the visually exposed sides of the panel, i.e. those formed between core 17 and corresponding side faces 101, 103 (102, 104 not shown) as well as "bottom face" 107 of tray 11 are critical in the sense that any surface irregularities of these parts of the panel may, and usually do, render unsuitable the product ob- tained.

It has been found according to the invention that indirect entry of the liquid resin composition via the prismatic space 12 and the slit-shaped opening 121 substantially reduces the occurrence of surface defects of the panels while operation of the method (positioning of mold) is simplified. Removal of the set composition in the area formed within space 12 (and, optionally, space 13) can be effected without problems by simple cutting after removal of the set coated panels from the mold.

As regards setting of the liquid resin composition, removal from the opened mold and any post-curing treatment for complete cross-linking, no particular changes are required and it is believed to be an essential advantage of the invention that the amount of retooling and procedural change required for adaption is minimal and limited to the exchange of the molds and the removal of the sprue wedges formed in the prismatic spaces.

FIG. 3 shows the rim juncture of FIG. 1 in an enlarged presentation as formed by rim 307 of tray 31 and the coextensive lid area 308; core 37 is supported by lid 35 in mold cavity 30; liquid resin is injected by resin gun 36 into prismatic space 32 (corresponding with spaces 12, 13 of FIG. 1) which forms the slit-shaped nozzle 321 adjoining side face 301 of tray portion 31. The recess at the rim juncture required to form a prismatic space suitable for the invention can be formed entirely by the rim portion of the tray as shown in FIG. 3, or entirely in the corresponding portion 408 of lid 45 as shown in FIG. 4, or partly by a lid portion and partly by a tray portion (not depicted).

It will be apparent from FIG. 4 that the prismatic space 42 formed by a recess in lid rim portion 408 and the coextensive rim 407 of tray 41 opens into the free interspace or molding cavity 40 at a part of the panel (after providing core 47 with a coat corresponding with interspace 40) which is at the "rear" side of the panel and thus not, or less, visually exposed upon typical furniture use.

The position of opening 151, 351 and 451 relative to space 12, 32, 42 is not critical if it is distanced sufficiently from the slit-shaped opening 121, 321, 421 in order to ascertain that the flow of liquid resin composition will be nonturbulent and laminar before emerging into mold cavity 10, 30, 40 adjoining side face 101, 301, 401 of tray 11, 31, 41.

Figure 5B:
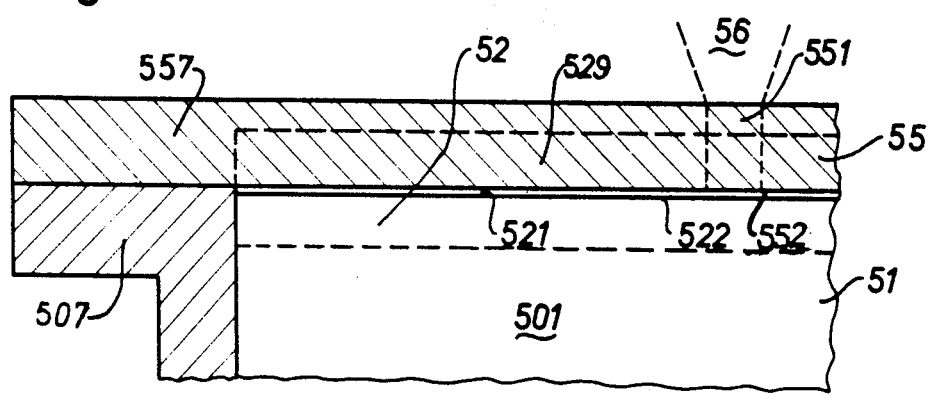
FIG. 5b is a front view of a part of the tray portion of FIG. 5a with the lid portion applied to close the casting mold and to form the slit-shaped nozzle for practicing the inventive method.

FIGS. 5a, 5b are shown for further illustration of how the slit-shaped opening or nozzle means may be formed according to the invention.

FIG. 5a is a perspective view partially sectioned and broken away of a corner of a diagrammatically simplified tray 51; the core is omitted and but one corner of the mold cavity 50 is shown.

Mold cavity 50 is defined by four inner side faces (only two shown in FIG. 5 as 501, 502) and bottom face 506; while the outer shape of tray 51 could essentially conform with the shape of the cavity as depicted, e.g. if the tray is shaped by deep-drawing or pressing, such outer shape is not believed to be essential and a block-like outer shape as shown in FIG. 6 is suitable as well.

Tray 51 is provided with a recess formed by a back face 526 and a longitudinal side face 523 that extends between two base faces (only one shown as 524) which may be coplanar with an inner side face 502 as shown, notably if the other recess-defining faces 523, 526 extend over the entire length (100%) of the adjoining inner side face 501 of tray 51 and not only a major portion (at least 50%) thereof.

The shape thus defined can be said to be a recess of rim 507 and a planar lid 55 put onto tray 51 for rim junction or juncture (terms used synonymously herein) achieved by contacting the tray's rim 507 with a corresponding portion 557 will provide the final definition of a prismatic space 52 according to the invention; as will be understood, the number of side faces of the prismatic space 52 is not believed to be overly critical and instead of a triangular cross-section (as evidenced by the shape of base face 524) another polygonal shape might be used as long as a reasonably well-defined edge 522 is formed which, in turn, will define one limit of the slit-shaped nozzle means arranged within the mold but outside the mold cavity according to the invention. For most purposes, an essentially triangular or tetrangular shape of base face 524 will be preferred.

As shown in FIG. 5b, the inner face 552 of lid 55 will cooperate with edge 522 to define the slit-shaped nozzle means 521 according to the invention which nozzle means, in turn, is the only connection between inlet opening 551 (including the external injection means 56 connected therewith) and molding cavity 50.

However, as explained in connection with FIG. 4, the prismatic recess which forms the slit-shaped nozzle means 521 need not be formed in 507 of tray 51 since it could be formed, partly or entirely, as a recess 529 of a lid area 557 of lid 55 as indicated diagrammatically in FIG. 5b.

Figure 6A:
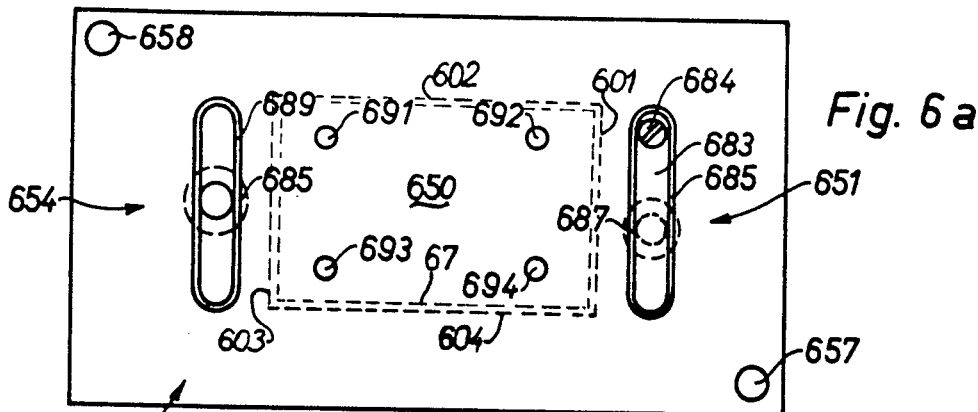
FIG. 6a, 6b, 6c and 6d are various views of lid and tray portion of a casting mold for practicing the invention.
Figure 6B:
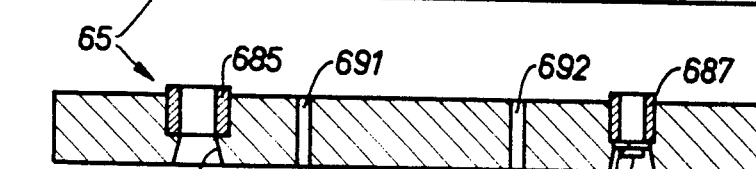
Figure 6C:
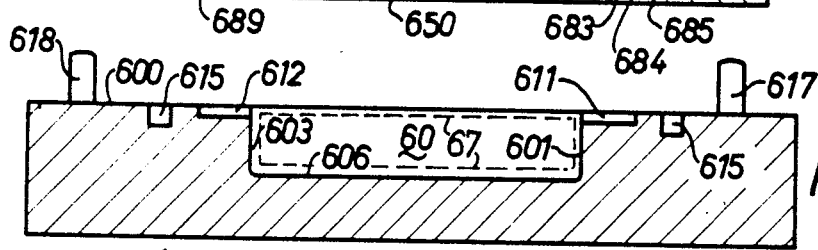
Figure 6D:
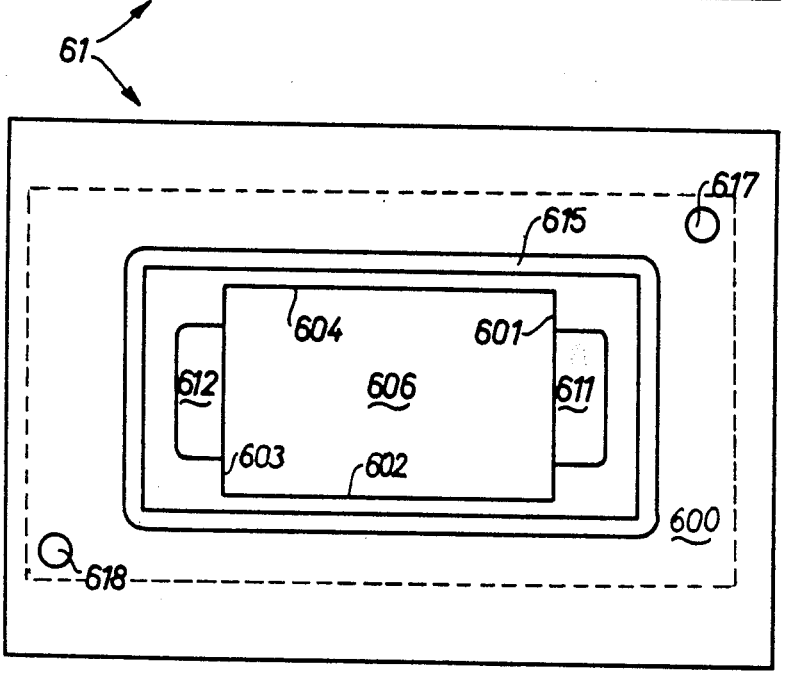

FIGS. 6a to 6d are shown to illustrate a lid portion 65 (FIG. 6a: bottom view; FIG. 6b: sectional view) and a corresponding tray portion 61 (FIG. 6c: sectional view; FIG. 6d: top view) for use according to the invention.

Mold lid 65 is provided with four bores 691, 692, 693, 694 that will receive matching positioning pins (not shown) supporting a panel core so that an interspace is maintained corresponding with the required thickness of the coat to be formed between the panel core and the adjacent inner molding face 650 or lid 65.

The position of the core is indicated by the broken line 67 in FIG. 6a and 6c only, while the relative position of the four inner side faces 601, 602, 603, 604 of the mold cavity 60 formed in tray 61 are shown in broken lines in FIG. 6a.

Lid 65 is provided with two positioning bores 657, 658 to receive and hold corresponding positioning pins 617, 618 of molding tray 61.

Inlet opening 651 is formed by a circular sleeve 687 (FIG. 6b) having an exposed upper end that matches with the nozzle of a conventional injection gun (not shown); the lower end of sleeve 687 is closed by an elongated valve flap 683 made of steel and mounted in a correspondingly shaped elongated recess 685 in the lower face of lid 65 as shown in FIG. 6b by means of screw 684. When at rest, flap 683 closes the lower end of sleeve 687 but will be lifted and permit passage of liquid resin composition emitted by an injection gun but return into closed rest position when no resin is injected.

Valve flap 683 and sleeve 687, in other words, form a one-way valve that will prevent that resin escapes through the inlet opening if the injection gun is removed prior to setting.

Outlet opening 654 has a similar structure as inlet opening 651 except that it does not normally need to function as a one-way valve so that no flap is required and the lower end of sleeve 685 opens directly into the elongated recess 689.

Molding tray 61 has an inner bottom face 606, four inner side faces 601, 602, 603, 604 and a lid face 600 to define, together with molding face 650 of lid 65, the molding cavity 60.

Two recesses 611, 612 are provided in the lid surface 600 of lid 61 adjoining to and parallel with inner side faces 601, 603. While both recesses 611, 612 are depicted with rectangular cross-sections (base faces) and while such recesses are suitable for the invention, it is generally preferred that the depth of the recess at the side thereof that adjoins the mold cavity 60 is slightly less, say by about 10%, than the recess depth near the back face of the recess, i.e. remote from mold cavity 60.

The inlet opening 651 of lid 65 opens into recess 611 near the back face region of the recess and a liquid resin composition capable of cross-linking can be fed into cavity 60 formed upon assembly of tray 65 and lid 61.

To ensure a sealed connection of tray 65 and lid 61, an annular channel 615 is arranged in the rim area and includes a conventional resilient sealing member, e.g. a rubber ring.

For casting, the assembled mold shown in FIGS. 6a to 6d will be arranged at an inclination of between about 10 and 40° with the inlet opening at the lower side of the inclined mold; liquid resin composition is now introduced into sleeve 687 through a matching nozzle of an injection gun and at a pressure sufficient to operate the one-way valve; injection is continued until resin composition is visible in outlet opening 654. The injected resin is allowed to set and the coated panel is removed from the mold after removing the lid.

Generally, any distance between the panel core and the mold cavity will be at least as large as the width of the slit-shaped nozzle means. Since the thickness of the coat will generally be above 1 mm, a preferred maximum nozzle width will be about 1 mm. The lower limit of the nozzle width depends somewhat upon the viscosity of the liquid resin composition and should be selected so as to safely preclude turbulence in the emerging film.

When producing essentially rectangular coated panels in sizes ranging from 60×100×40 to 25×1000×2000 mm with a coat thickness of 2 mm it was observed that, when operating with prior art molds as shown in FIG. 2, even an excessively large injection nozzle (100 mm diameter) will cause flow velocities near the inlet opening of the mold that are 6 to 50 times higher than the flow velocities at the free interspaces between the panel core and the mold cavity; this causes significant turbulences extending from the panel adjacent the inlet end to areas that will normally be situated on a visibly exposed part of the coated panel as evidenced, at best, by inhomogeneities of texture or, at worst, by visible voids or pores.

However, when producing coated panels of the same sizes according to the method of the invention, such visible defects of the final panels were absent; particularly preferred operating conditions of the inventive method are those where the ambient viscosity of the liquid resin composition is below 10 Pa.s and the flow velocity of the liquid resin in the free interspace is below about 5 meters per minute (m/min), preferably in the range of 0.5 to 3 m/min and particularly between 0.5 to 2 m/min; at the same time, the flow velocity at the slit-shaped nozzle means within the mold is preferably not more than 10 times and preferably not more than 6 times greater than that within the free interspace; a particularly preferred range of flow velocities at the slit-shaped nozzle means is in the range of from about 1 to about 10 m/min.

Various modifications of the invention will be apparent to the expert; for example, while production of substantially planar or flat coated panels has been discussed, the invention can be operated for producing profiled panels, e.g. by modifying the structure of the inner faces of the tray portion and using correspondingly shaped cores or thinner cores. Further, profiled or curved edges as well as an intentionally structured surface appearance can be achieved by shaping or structuring the inner faces of the tray portion in a corresponding manner.

Further, while rectangular panels have been discussed above, the inventive method and mold can be used for producing other polygonal or even rounded panels by correspondingly modifying the shape of the mold cavity, preferably within the portion.

While there are shown and described preferred embodiments of the present invention, it is to be distinctly understood that the invention is not limited thereto but may be embodied and practiced within the scope of the following claims: accordingly,

What I claim is:

1. In a casting mold for use in producing panels each having an integral coat of a cross-linked polymer matrix, said mold consisting essentially of:
   (A) a lower or tray portion having an inner bottom face, at least four times side faces, and an essentially continuous rim face adjoining said inner side faces;
   (B) an upper or lid portion having a face that is essentially co-extensive with said tray portion to form, with said inner sides of said tray portion, a mold cavity that is closed by juncture of said rim face of said tray portion and of a coextensive part of said lid portion, said lid portion having means for supporting a panel core at a distance from said lid face;
   (C) an inlet opening for introducing a liquid resin composition into said mold and an outlet opening for permitting air to escape from said mold when said liquid resin composition is introduced through said inlet opening;
   the improvement consisting essentially of:
   (D) an elongated recess substantially aligned with one of said inner side faces of said tray portion and arranged adjoining thereto within an area of said juncture of said rim face of said tray portion and said co-extensive part of said lid portion, said recess being shaped to form an elongated and essentially prismatic space when said rim face is in said juncture with said co-extensive face portion of said lid; said prismatic space having an edge portion extending over at least about 50% of said one inner side tace and forming an elongate slit shaped nozzle means communicating with said mold cavity when said casting mold is closed, and
   (E) said inlet opening ending in said prismatic space for feeding said liquid resin composition into said prismatic space so as to form at said slit-shaped nozzle means a smooth and laminar film for filling said mold cavity with said liquid resin composition substantially without turbulence of flow.

2. The casting mold of claim 1 wherein said inlet opening is arranged in said lid portion that is essentially co-extensive with said rim face of said tray.

3. The casting mold of claim 1 wherein a second essentially prismatic space and second slit-shaped nozzle means is arranged at a second area of said juncture near said outlet opening.

* * * * *